March 3, 1964 K. M. POOLE 3,123,771

COMMUNICATION REPEATER TRAVELING WAVE TUBE AMPLIFIER AND OSCILLATOR SYSTEM

Filed Dec. 29, 1961

INVENTOR
K. M. POOLE
BY Roy M. Porter Jr.
ATTORNEY

United States Patent Office 3,123,771

Patented Mar. 3, 1964

3,123,771
COMMUNICATION REPEATER TRAVELING WAVE TUBE AMPLIFIER AND OSCILLATOR SYSTEM

Kenneth M. Poole, Bernardsville, N.J., assignor to Bell Telephone Laboratories, Incorporated, New York, N.Y., a corporation of New York Filed Dec. 29, 1961, Ser. No. 163,269
4 Claims. (Cl. 325—9)

This invention relates to amplifiers and to oscillators and, more particularly, to systems for producing oscillations in one frequency range and simultaneously amplifying an intelligence signal in another frequency range with the same amplifying device.

In satellite communications systems, a single orbital repeater, or a very small number of such repeaters, are to be used to relay the radio signals over distances greater than typical transmission distances on the surface of the earth. Therefore, the satellite repeater must produce the necessary power amplification with the lowest possible weight and the lowest possible total power consumption. Satellite power sources are at present very severely limited in the amount of power which can be made available over long periods of time.

There are several reasons why it may be desirable for the satellite repeater to perform one or more frequency-shifting operations. First, the frequency radiated from the satellite should be different from the frequency received by it in order to prevent oscillation of the entire repeater system because of feedback from the satellite transmitting antenna to the satellite receiving antenna. Second, high amplification can be obtained with the greatest stability and economy at a relatively low, or so-called intermediate, frequency. In application of similar principles to a terrestrial multihop system, frequency shifting prevents reception of a signal at any one repeater which by-passed the immediately preceding repeater. Otherwise, objectionable interference with transmission could result from small time differences in transmission paths.

The requirements of low weight and low power consumption make it imperative to minimize the amount of equipment used to perform the functions of amplifying and frequency shifting and to combine functions wherever possible.

A traveling wave tube can be used simultaneously as amplifier and local oscillator. It possesses appreciable gain over a range of frequencies wide enough that a substantial separation of oscillation frequencies and intelligence carrier frequencies is possible.

In applying the wide-range frequency response, or broad-band characteristic, of the traveling wave tube in the dual capacity just described, several problems arise. The first problem is that fluctuations in the input intelligence signal level may cause variations in the gain of the traveling wave tube; for example, an increase in the level of the input intelligence signal may result in the phenomenon known as saturation, with a resulting decrease of the gain of the traveling wave tube. This fluctuation of gain may be severe enough to cause complete loss of the local oscillator signal. Another cause of loss of local oscillator signal is component degradation, as, for example, aging of the traveling wave tube with a consequent loss of gain. This problem is grave because a satellite is inaccessible for readjustment.

A second problem is that in communications satellites the limited available power is not sufficiently utilized merely by minimizing the number of components. It is also necessary to put a maximum proportion of the power used by a single traveling wave tube into the amplified intelligence signal.

Therefore, it is the object of the invention to prevent loss of local oscillator signal in systems for amplifying an intelligence signal and simultaneously producing a local oscillator signal.

Another object of the invention is to maximize the proportion of the consumed electrical power which appears in the amplified intelligence signal in the aforesaid systems.

According to the invention applicant has recognized that both objects can be achieved simultaneously by limiting the amplitude of the single-frequency, or continuous-wave, regenerative feedback signal which serves to sustain the local oscillations. Thus, the power consumed in the local oscillator signal can be held at a virtually constant level which is just enough for frequency shifting, for regeneration and for providing a reasonable margin to protect against decreases in traveling wave tube gain through temporary saturation and component degradation. A limiting margin achieves the primary object of the invention because, when the gain of the traveling wave tube decreases, such as in the case of saturation, the limiter allows a greater portion of the signal applied to it to pass. Thereby oscillations tend to be sustained because total loop gain can remain at unity even as the gain within the traveling wave tube varies.

The principles of the invention and further objects and advantages will be more fully developed and explained by the following detailed description in conjunction with the accompanying drawings in which.

Figure 1:
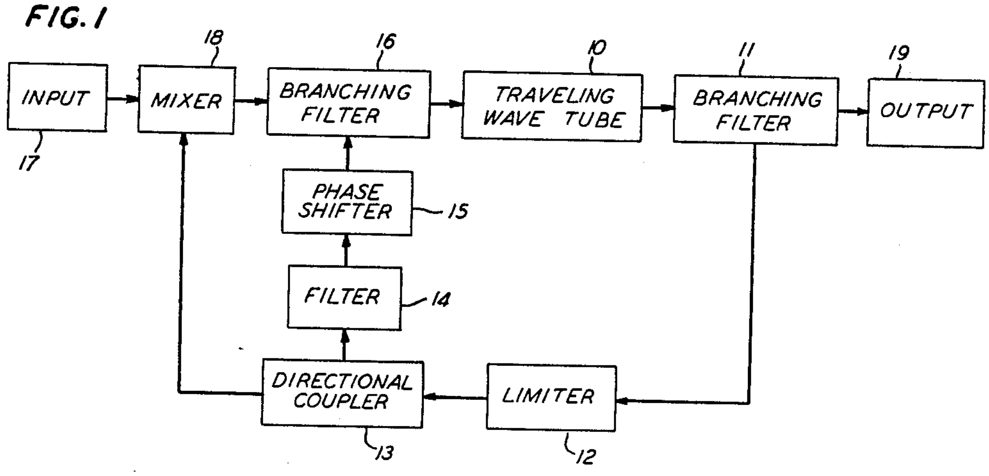
FIG. 1 is a block diagrammatic illustration of a preferred embodiment of the invention.

In FIG. 1, input 17 may include a receiving antenna or other source of information-bearing electromagnetic waves and may also include some initial stages of amplification and frequency-shifting. For the sake of convenience, the final stage of amplification and the final frequency-shifting operation are chosen to illustrate the invention although other stages may also utilize its principles. Output 19 may include a transmitting antenna or other means for utilizing an information-bearing electromagnetic wave.

Traveling wave tube 10 is a very broad-band microwave amplifying device. That is, it exhibits a substantially constant gain over an extremely wide range of frequencies. A more detailed description of traveling wave amplifying devices may be found in articles in the I.R.E. Proceedings for February 1947, entitled "Traveling Wave Tubes" by J. R. Pierce and L. M. Field at page 108, "Theory of Beam Type Traveling Wave Tubes" by J. R. Pierce at page 111, and "The Traveling Wave Tube as Amplifier at Microwaves" by R. Kompfner at page 124 and in a book by J. R. Pierce entitled "Traveling Wave Tubes," Van Nostrand 1950. Traveling wave tube 10 might be replaced by any other amplifying device with a frequency response sufficiently wide that signals within two separated frequency ranges can be amplified through the device.

Branching filter 11 is a frequency-sensitive microwave branching component designed to pass the frequencies associated with the amplified intelligence signal to output 19 and to divert the local oscillator frequency to limiter 12 in the regenerative feedback loop. More detailed descriptions of branching filters may be found in United States Patent 2,531,447, issued November 28, 1950, for the invention of W. D. Lewis and in the book by G. C.

Southworth entitled "Principles and Applications of Waveguide Transmission," Van Nostrand 1950, at pages 311–317 and 339–340.

Limiter 12 is an electrical component which throughout a predetermined range of input amplitude or intensity produces an output with constant amplitude or intensity. A description of a typical microwave limiter may be found in United States Patent 2,652,540, issued September 15, 1953, for the invention of A. F. Dietrich.

Directional coupler 13 is a device for routing the major portion of the local oscillator power to mixer 18 and a smaller portion to filter 14 and the remainder of the regenerative feedback loop for reapplication to traveling wave tube 10. A description of directional couplers may be found in the above-cited book by Southworth at pages 346–347. A great variety of other junctions might be used. It should be noted that, in general, frequency sensitivity is not needed at this point and that directional couplers offer the advantage of being lighter, simpler, and cheaper than most other junctions.

Filter 14 plays an important role in determining the local oscillator frequency. It plays the primary role in determining the open loop transmission characteristic of traveling wave tube 10 and its associated regenerative feedback circuit in the absence of limiting by limiter 12, which characteristic is illustrated by curve 50 of FIG. 3. It may be seen that filter 14 has a bandpass characteristic. A description of this type of filter may be found in the above-cited book by Southworth at pages 286–303.

Phase shifter 15 plays perhaps the most important role in determining the local oscillator frequency, since it is essential for sustaining oscillations that there be an integral number of cycles of the oscillatory wave around the loop. Descriptions of phase shifters may be found in the above-cited book by Southworth at pages 325–335.

Branching filter 16 is similar to branching filter 11, except that it is used to combine signals of different frequencies instead of separating them. It might be called a combining filter. It combines the output of mixer 18, which output contains the intelligence signal, with the output of phase shifter 15, which output consists of the local oscillator frequency, for amplification by traveling wave tube 10. In addition to its combining function, it may also route stray signals of local oscillator frequency which may come from mixer 18 into a termination so that they do not affect the local oscillator level at the input of traveling wave tube 10. This difference in treatment of the same sort of signal coming from two different directions is explained in the above-cited book by Southworth at pages 316–317.

Mixer 18 shifts the frequency of signals coming from input 17. It is variously called a first detector, a converter, or a modulator. A description of typical microwave mixers may be found in the above-cited book by Southworth at pages 637–645.

In operation, the intelligence-bearing signal from input 17 and the local oscillator signal from directional coupler 13 in the regenerative feedback loop are applied to mixer 18. The output of mixer 18, which may contain either sum or difference frequencies, or both, is applied to one input of branching or combining filter 16. To the other input of branching or combining filter 16 is applied the remaining signal from the regenerative feedback loop, which signal has just emerged from phase shifter 15. Branching filter 16 combines these two signals and applies them to the input of traveling wave tube 10. Also, branching filter 16 can prevent any signal at the local oscillator frequency coming from mixer 18 from passing to the input of traveling wave tube 10.

Traveling wave tube 10 then amplifies both signals applied to it, although they may be widely divergent in frequency. If the output of mixer 18 exhibits some amplitude modulation, the local oscillator frequency output of traveling wave tube 10 will contain some phase modulation, because of intermodulation; but objectionable effects therefrom are minimized by operating characteristics of the regenerative feedback loop which will be more fully described hereinafter. The output of traveling wave tube 10 is then divided by branching filter 11 with signals within a narrow band of frequencies including the desired local oscillator frequency being diverted to the input of limiter 12 in the regenerative feedback loop and signals at other frequencies being passed to output 19. Elimination of unwanted frequencies from output 19 would usually be accomplished by a filter placed between mixer 18 and branching filter 16, rather than by a filter placed between branching filter 11 and output 19, in order to conserve power in traveling wave tube 10.

The signals diverted to limiter 11 now undergo amplitude limiting by limiter 11. This operation need not occur first; rather, limiter 11 can appear in any position in the regenerative feedback circuit. This fact can best be understood by considering the traveling wave tube gain to be increased from some level below the low level loss of the remainder of the loop. At this point the over-all gain of the loop, measured between two terminals by opening the loop at any point, will be less than unity and the completed loop will not sustain oscillations. With increase in the gain of traveling wave tube 10, the open loop gain will exceed unity at a frequency $f_0$, at the peak of curve 50 shown in FIG. 3. No limiting has occurred until this time. With appropriate adjustment of phase shifter 15 to give an integral number of cycles around the loop at the frequency $f_0$, oscillations will start at this frequency; and the amplitude of the oscillations will rise until limiter 12, by limiting the amplitude of the oscillations, begins to clip the open loop characteristic shown in FIG. 3 and thus restores the loop gain to unity. Further increase in the gain of traveling wave tube 10, which is necessary to insure oscillation will be sustained with changes in component characteristics and transient fluctuations in level of signals from mixer 18, will cause more limiting action. In other words, the open-loop characteristic in FIG. 3 will be modified as if cut off at some point below point X, the difference between the two points being the amount of limiting.

Figure 3:
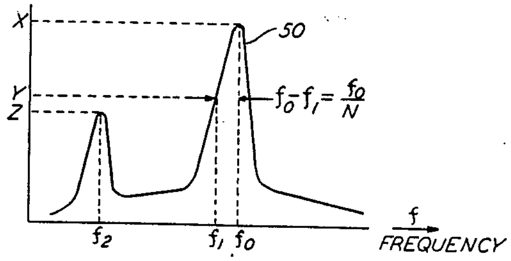
FIG. 3 shows a curve which is useful in explaining the theory and operation of the invention and represents the open-loop transmission characteristic of the traveling wave tube and its associated regenerative feedback circuit in FIGS. 1 and 2 in the absence of limiting action.

Control of the oscillator frequency is now maintained primarily by phase shifter 15 which provides a vernier adjustment within the band of frequencies passed by filter 14. At frequencies slightly above or below $f_0$, it provides a phase shift that causes a nonintegral number of wavelengths around the loop; and oscillations will not be sustained. However, even within the band passed by filter 14, phase shifter 15 cannot control the frequency uniquely if the gain of the traveling wave tube is increased to such an amount that point Y in FIG. 3 rises above the limiting level. Then, frequency $f_1$ can also exist. As illustrated in FIG. 3, $f_1$ is the frequency which gives exactly one less wavelength around the loop than the frequency $f_0$. Thus, $$f_0 - f_1 = \frac{f_0}{N}$$

where N is the number of wavelengths around the loop at the frequency $f_0$. The frequency $f_1$ could just as well be greater than $f_0$, if its separation from $f_0$ is sufficient to allow a corresponding relationship. When such an $f_1$ exists, the frequency may jump back and forth between it and $f_0$ or both oscillations may exist simultaneously. Therefore, the degree of limiting must be less than the difference between X and Y. It also must be less than the difference between X and Z where Z is the level of the highest transmission peak outside the desired range. The unwanted mode of the open-loop characteristic rising to the level Z represents frequencies which pass fairly well through filter 14 and will in general contain some frequency $f_2$ near its peak which will give an integral number of cycles around the loop. Thus, if the amount of limiting exceeds the difference between X and Z, the oscillation frequency will jump back and forth between $f_2$ and $f_0$. The level Z may lie above or below the level Y, the maximum degree of limiting being determined by the more severe of the above two criteria.

However, within the restrictions just described, a substantial amount of limiting can be provided. The margin for component degradation within which oscillation will be maintained is then equal to the degree of limiting. This automatic adjustment for component degradation is very important because it is difficult to gain access to adjust a communications satellite.

Even in the absence of component degradation, the limiter offers substantial advantages in sustaining oscillations. Suppose that the output of mixer 18 experiences an increase in amplitude. This increase will be passed through branching filter 16 to the input of traveling wave tube 10. According to a well-known phenomenon in traveling wave tubes, an increase of input signal will tend to saturate, or decrease the gain of, a traveling wave tube, particularly if it is operating near its maximum power capacity. Thus, a decrease in gain of traveling wave tube 10 for the local oscillator signal will result. Without a limiter, if the loop gain was previously unity, it would now be less than unity and the local oscillator signal would be lost. However, with limiter 12, a lesser amount of limiting occurs, the loop gain remains at unity, and the local oscillator signal continues.

The automatic adjustment just described is achieved with a minimum consumption of power in the local oscillator signal. Only that power needed for mixer 18, for maintaining oscillations at the single-frequency $f_0$, and for protecting against decrease in gain is used. This situation should be contrasted with that which would exist if limiter 12 were removed and the saturation characteristic of the traveling wave tube were relied on to provide inherent limiting. The oscillator signal would rise in level to saturate traveling wave tube 10. The local oscillator signal would take increased power, and there would be less power in the amplified intelligence signal since the total output power of traveling wave tube 10 is essentially constant. In other words, limiter 12 allows traveling wave tube 10 to oscillate stably at levels below saturation, with a high gain and with as high a proportion of the output power in the amplified intelligence signal as is possible.

The wide disparity in the levels of intelligence and oscillator signals also means that intermodulation in traveling wave tube 10 is minimized. Limiter 12 maintains that disparity in levels.

Figure 2:
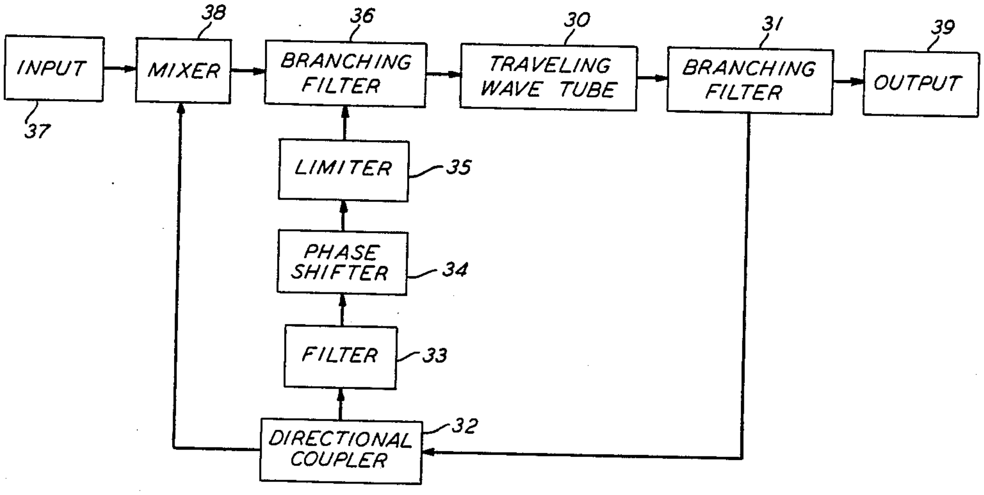
FIG. 2 is a block diagrammatic illustration of a modification of the embodiment of FIG. 1.

In FIG. 2, a modification of the invention is illustrated. The components all correspond to components described for the embodiment of FIG. 1. Whereas the limiter in FIG. 1 was placed before the point at which local oscillator power was taken off to the mixer, in FIG. 3 it is placed after that point. Limiter 35 now appears after the phase shifter 34 and before the branching filter 36, which is at the input of traveling wave tube 30.

Losses are now reduced between the output of traveling wave tube 30 and the local oscillator input to mixer 38. However, fluctuations in the gain of traveling wave tube tend to appear as an amplitude variation in the local oscillator signal at mixer 38. Otherwise, the principles of operation and advantages for the modification of the invention shown in FIG. 2 are the same as for the basic embodiment of FIG. 1.

In all cases, it is understood that the above-described arrangements are illustrative of a small number of the many specific embodiments which can represent applications of the principles of this invention. Numerous and varied other arrangements can readily be devised in accordance with these principles by those skilled in the art without departing from the spirit and scope of the invention.

What is claimed is:

1. A communications system comprising a source of intelligence signals having characteristic frequencies, a modulator having a first input connected to said source and having a second input for a local oscillator signal, said modulator further having an output for passing intelligence signals shifted in frequencies from said characteristics frequencies, traveling wave amplifying apparatus having a first combining filter input connected to said modulator output for receiving said shifted intelligence signals and having a second combining filter input for receiving said local oscillator signal, said amplifying apparatus having a first branching filter output adapted for passing said shifted intelligence signals as amplified and blocking said local oscillator signal, said amplifying apparatus further having a second branching filter output adapted for passing said local oscillator signal and blocking said characteristic frequencies and frequencies of said shifted intelligence signals, and a regenerative feedback circuit connected from said second branching filter output to said second combining filter input for producing said local oscillator signal, characterized in that said feedback circuit comprises a limiter for limiting said local oscillator signal and a junction having an input and a first output connected serially with said limiter in said feedback circuit and having a second output coupled to said second modulator input for supplying said local oscillator signal to said modulator.

2. A system according to claim 1 wherein the feedback circuit includes a bandpass filter adapted for passing said local oscillator signal and blocking the characteristic frequencies and the frequencies of the shifted intelligence signals and a phase shifter serially connected with said bandpass filter in said feedback circuit and adapted for providing an integral number of cycles of said local oscillator signal in said amplifying apparatus and said feedback circuit in combination.

3. A system according to claim 2 wherein the limiter precedes the junction in the feedback circuit and the bandpass filter and the phase shifter follow said junction.

4. A system according to claim 2 wherein the limiter, the bandpass filter, and the phase shifter follow the junction in the feedback circuit.

References Cited in the file of this patent

UNITED STATES PATENTS

| | | |
|---|---|---|
| 2,593,113 | Cutler | Apr. 15, 1952 |
| 2,617,885 | Cutler | Nov. 11, 1952 |
| 2,787,673 | Cutler | Apr. 2, 1957 |